United States Patent [19]

Shimazu et al.

[11] Patent Number: 4,980,383
[45] Date of Patent: Dec. 25, 1990

[54] FOAMED ARTICLE OF CHLORINATED VINYL CHLORIDE RESIN CONTAINING INORGANIC MATERIAL

[75] Inventors: Hisao Shimazu, Settsu; Yoshihiro Kimura, Osaka, both of Japan

[73] Assignee: Kanegafuchi Kagaku Kogyo Kabushiki Kaisha, Osaka, Japan

[21] Appl. No.: 277,721

[22] Filed: Nov. 30, 1988

Related U.S. Application Data

[63] Continuation-in-part of Ser. No. 82,692, Aug. 5, 1987.

[30] Foreign Application Priority Data

| Aug. 6, 1986 | [JP] | Japan | 61-184685 |
| Aug. 19, 1986 | [JP] | Japan | 61-193770 |
| Sep. 4, 1986 | [JP] | Japan | 61-208422 |
| Dec. 4, 1986 | [JP] | Japan | 61-289586 |

[51] Int. Cl.$^5$ ............................................. C08J 9/00
[52] U.S. Cl. ............................................. 521/85; 521/91; 521/92; 521/145
[58] Field of Search ................... 521/145, 85, 91, 92

[56] References Cited

U.S. PATENT DOCUMENTS

| 3,366,580 | 1/1965 | Kraemer | 521/145 |
| 3,474,048 | 10/1969 | Chappelear et al. | 521/145 |
| 4,165,415 | 8/1979 | Adachi et al. | 521/145 |
| 4,345,040 | 8/1982 | Hall | 521/145 |
| 4,360,602 | 11/1982 | Nehmey | 521/145 |
| 4,374,205 | 2/1983 | Hall | 521/145 |
| 4,383,048 | 5/1983 | Hall | 521/145 |
| 4,390,286 | 1/1983 | Nehmey | 521/145 |
| 4,401,612 | 8/1983 | Nehmey | 521/145 |
| 4,409,165 | 10/1983 | Kim | 521/145 |
| 4,413,065 | 11/1983 | Hall | 521/145 |

*Primary Examiner*—Morton Foelak
*Attorney, Agent, or Firm*—Armstrong, Nikaido Marmelstein, Kubovcik and Murray

[57] ABSTRACT

A foamed article of a chlorinated vinyl chloride resin containing an inorganic material, which contains an inorganic fibrous material in an amount of not less than 0.003 g per 1 cm$^3$ of the article or inorganic particles in an amount of not less than 0.06 g per 1 cm$^3$ of the article and which has dimensional retention of not less than 70% when the article is heated at 200° C. for one hour and an expansion ratio of not less than 5 times, which is prepared by the process comprising the steps of (1) preparing a foamable composition by kneading a mixture comprising a chlorinated vinyl chloride resin, an inorganic material, a chemical blowing agent and a solvent, (2) filling a closable mold with the foamable composition, (3) heating the foamable composition under pressure in the mold to generate a gelled chlorinated vinyl chloride resin and to decompose said chemical blowing agent, (4) cooling the foamable composition in the mold to a temperature suitable for expansion, and (5) opening the mold to give a foamed article. The foamed article has excellent dimensional retention at high temperatures as well as excellent mechanical property and shows little calorie, smoke and poison gas.

20 Claims, No Drawings

FOAMED ARTICLE OF CHLORINATED VINYL CHLORIDE RESIN CONTAINING INORGANIC MATERIAL

CROSS-REFERENCE TO RELATED APPLICATION

This is a continuation-in-part of application Ser. No. 082,692 filed on August 5, 1987.

BACKGROUND OF THE INVENTION

The present invention relates to a foamed article of a chlorinated vinyl chloride resin (hereinafter referred to as "CPVC") containing inorganic materials, and more particularly to a foamed article of a CPVC containing inorganic materials having original characteristics of the CPVC that an obtained foamed article generates little heat, produces little smoke and is excellent in heat resistance and flame resistance, and the like and further, having a large dimensional stability defined by dimensional retention when an obtained foamed article is exposed in an atmosphere of high temperatures, for instance, the foamed article is left in the atmosphere of 200° C. for one hour, which can be suitably used as heat insulating materials, building materials, chemical installation parts, electric equipments, vehicle parts, and the like.

The CPVC essentially shows flame resistance since the CPVC contains chlorine as one of the elements and the CPVC has the characteristics that an obtained foamed article generates little heat and produces little smoke when the article is compulsively burned.

Therefore, it has hitherto been expected that the foamed article of the CPVC is used as a heat insulating material having high fireproofing property.

However, the CPVC which is used as a base resin of a foamed article has problems that when the foamed article is heated to the temperature of 200° C., the foamed article is rapidly shrunk and it can not be applied to a practical using and that when the foamed article is compulsively left in a burning atmosphere, the foamed article is shrunk to the stage which does not maintain its original shape.

Examples of conventional processes for preparing the foamed article of the CPVC are, for instance, (1) a process for preparing a foamed article wherein a physical blowing agent is impregnated into a powder of the CPVC or a pellet of the CPVC and then the CPVC is extruded to carry out expansion with an extruder, (2) a process for preparing a foamed article wherein a physical blowing agent is impregnated into a pellet and the pellet is introduced into a mold which is preheated to expand the pellet, (3) a process for preparing a foamed article wherein the CPVC is introduced into an extruder, a physical blowing agent is introduced into the extruder under pressure and at the same time the CPVC and the physical blowing agent are melted and mixed together and then the melted CPVC mixture is extruded to carry out expansion, (4) a process for preparing a foamed article wherein a CPVC is mixed with a chemical blowing agent and the CPVC is extruded to carry out expansion (however, the obtained foamed article is an article having a low expansion ratio, that is, about 3 times), and the like.

However, according to the conventional processes for preparing a foamed article of the CPVC, it is difficult to obtain a good foamed article containing a large amount of inorganic materials since cell membranes are broken when expanding and the obtained article has many opened cells even though a large amount of inorganic materials are contained in the CPVC.

In recent years, many studies of the process for preparing a foamed article have been investigated and, for instance, a process for preparing a foamed article of the CPVC wherein an alcohol is contained as a physical blowing agent in the CPVC and the CPVC is heated to expand, which is disclosed in Japanese Examined Patent Publication (Tokkyo Kokoku) No. 27300/1978 corresponding to U.S. Pat. No. 4,165,415; and a process for preparing a foamed article of the CPVC wherein a specific solvent is contained as a physical blowing agent in the CPVC and the CPVC is heated to expand, which is disclosed in Japanese Examined Patent Publication (Tokkyo Kokoku) No. 25340/1983 are well-known.

However, according to these processes, a foamed article of the CPVC having a required dimensional retention at high temperatures cannot be obtained.

The present inventors have studied to develop a foamed article having a suitable dimensional retention. As the results of their researches, according to the conventional processes, although cell membranes are broken at the time of expanding or the obtained foamed article becomes brittle when a large amount of inorganic materials are contained in the CPVC, they have found an unexpected foamed article having a suitable dimensional retention and not having the above-mentioned problems and the process for preparing thereof by including a large amount of inorganic materials into the CPVC and they have accomplished the present invention.

SUMMARY OF THE INVENTION

First of all, according to the present invention, there is provided a foamed article having a dimensional retention of not less than 70% when the article is heated at the temperature of 200° C. for one hour and having an expansion ratio of not less than 5 times.

The foamed article of the CPVC containing inorganic materials of the present invention is prepared by containing inorganic materials in the CPVC and then expanding. The dimensional retention of the foamed article when the foamed article is exposed in an atmosphere having a high temperature, largely depends on kinds of the inorganic materials and their amounts.

It is not always easy to evaluate the shrinkage behavior. Therefore, the present inventors have been studied to develop the method for evaluating the shrinkage behavior. As the result of the present inventors' researches, they have found the method for evaluating the shrinkage behavior by measuring the dimensional retention when the article is heated at a temperature of more than the softening temperature of the CPVC, that is, 200° C. for one hour. As the result of measuring the dimensional retention of the foamed article containing various kinds of inorganic materials, they have found that the dimensional retention is influenced by the kinds of inorganic materials contained in the article and the amount of inorganic materials contained in a unit volume of the foamed article.

As the results, the dimensional retention of a foamed article not containing inorganic materials in the above-mentioned condition is about 40% and the article is largely shrunk. However, the dimensional retention of the foamed article of the present invention is not more than 70% and the shrinkage by heating is extremely small since the amount of inorganic materials included in a unit volume of the article can be suitably prepared in accordance with the kinds of the inorganic materials. That is, the foamed article of the CPVC of the present invention generates little heat and produces little smoke and it shows an extremely small dimensional shrinkage when it is heated to the temperature of more than the softening temperature of CPVC, that is, 200° C.

The second, according to the present invention, there is provided a foamed article of a composition comprising a CPVC having a chlorine content of not less than about 68% by weight and containing a phosphoric ester and inorganic materials. The characteristics that the CPVC generates small heat and produces small smoke become more remarkable in accordance with increasing the chlorine content.

Though the CPVC has the above-mentioned characteristics, when a foamed article made of a composition comprising CPVC having a chlorine content of not less than about 68% by weight and inorganic materials is compulsively burned by the method, for instance, the surface test method prescribed in JIS A 1321, it is difficult to maintain the form of the foamed article since the resin parts of the foamed article are burned to ashes, and in some cases, the foamed article is broken.

These properties of the foamed article which is made from the CPVC having a chlorine content of not less than about 68% by weight are not preferable to be used as a heat insulating material having a high fire protecting property.

As the results of the present inventors' researches, they have found the remarkable effects that the resin parts of the foamed article are not burned to ashes when a phosphoric ester is included in the composition comprising the CPVC having a chlorine content of not less than about 68% by weight and inorganic materials in the case the foamed article is tried to be compulsively burned. That is, the present inventors have found a foamed CPVC article having a high chlorine content which generates very small amount of heat and smoke, which shows an extremely small shrinkage when the foamed article is heated at a temperature of more than the softening temperature of the CPVC, that is, 200° C. and moreover, of which resin parts are not burned to ashes when the foamed article is compulsively burned and which has a high dimensional retention.

The third, according to the present invention, there provided for the first time a process for preparing a foamed article of the CPVC excellent in fire protecting properties by including a large amount of inorganic materials into the CPVC as mentioned above.

The present invention makes it possible to produce a foamed article of the CPVC containing a large amount of inorganic materials by a process comprising the steps of (1) preparing a foamable composition by kneading the CPVC, inorganic materials, a chemical blowing agent and a solvent, (2) filing a closable mold with the resulting composition, (3) heating the composition under pressure in order to melt the CPVC to generate a gel and to decompose the chemical blowing agent, (4) opening the mold at the temperature suitable for expanding and (5) at the same time expanding the composition.

The term "temperature suitable for expanding" means a temperature when a cell menbrane of the resin can be extended to a desired expansion ratio having a practical meaning which depends on the uses, for instance, when an obtained article is employed as a fire insulating material of building materials, the expansion ratio is not less than about 5 times. The temperature suitable for expanding is changed depending on the kinds of CPVC, the kinds and amount of inorganic materials, chemical blowing agents and solvents, and depending on the form and size of a foamed article to be obtained.

One of the important points of the present invention is to use a solvent having an ability to gel the CPVC.

That is, the present invention makes it possible to add a large amount of inorganic materials into the CPVC by forming a uniform gel phase of the CPVC and the solvent and wrapping the inorganic materials in the gel phase. In particular, even when inorganic fibrous materials which has a tendency to prevent expanding are contained in the CPVC, a process for preparing a foamed article having a high expansion ratio and high percentage of closed cell can be realized according to the present invention.

Though the functions of the solvent are not yet always obvious in details, it is thought that the solvent has a function to increase the degree of wrapping the inorganic materials in the resin parts by forming a uniform gel phase and increasing the volume of the resin parts in comparison to the case that the solvent is not included and by lowering the viscosity of the resin parts. Also, it is thought that the air bonded on the surface of the inorganic materials is removed by wetting the surface of the inorganic materials with a solvent, and thereby the surface of the inorganic materials and the resin parts are stiffly adhered.

Further, it is thought that the solvent shows the effects to dissolve the expanding gases such as nitrogen gas and carbon dioxide gas generated by the decomposition of the chemical blowing agent and to possess the expanding gases in a mold safely while the mold is closed.

In addition to the above-mentioned characteristics, there are some other advantages that the processing temperature for molding is largely lowered in comparison with the usual processing temperature for molding a CPVC. Therefore, lowering the processing temperature by using a large amount of the solvent decreases dangers such as the troubles of decomposition and deterioration of the CPVC compared with a conventional method.

Thus the process for preparing the foamed article of the CPVC containing a large amount of inorganic materials is realized. The solvent also has a function to improve the dimensional stability of the foamed article of the CPVC containing inorganic materials. It is thought that the improving effect of the dimensional stability is based on the function that the viscosity of the composition of the CPVC is lowered when the composition is expanded and thereby the shrinkage generated by residual stress and residual strain in the foamed article is lowered. Also, it is thought that since the volume of the resin parts are increased by a solvent, an increased volume of the composition is diminished when expanding the composition to give a foamed article having a constant expansion ratio, and thereby shrinkage generated by residual stress and residual strain is lowered. Further, it is thought that since the solvent is contained in the composition, the residual stress and residual strain are lowered and released in a short time when the composition is expanded.

These and other objects of the present invention will become apparent from the description hereinafter.

DETAILED DESCRIPTION OF THE INVENTION

The term "CVPC" in the present invention means not only a chlorinated polyvinyl chloride resin but also a mixed resin containing chlorinated polyvinyl chloride at a content of not less than 50% by weight. Examples of the resin which is mixed with chlorinated polyvinyl chloride are, for instance, vinyl chloride resin, vinyl chloride-vinyl acetate copolymer, chlorinated polyethylene, vinyl chloride-vinylidene chloride copolymer, ethylene-vinyl acetate copolymer, methacrylate-acrylate copolymer, thermoplastic polyurethane, acrylonitrile-butadiene copolymer, and the like.

As the vinyl chloride resin which is chlorinated, a copolymer containing vinyl chloride at a content of not less than 50% by weight can be used as well as a usual vinyl chloride resin.

Any chlorinating methods which are conventionally adopted, for instance, photo-chlorination method under ultraviolet irradiation, and the like can be employed in the present invention.

The average degree of polymerization of the CPVC is not particularly limited in the present invention and is preferably 300 to 5000, more preferably 500 to 4000, particularly 1000 to 3000. When the average degree of polymerization of the CPVC is less than 300, several properties of an obtained foamed article are lowered. The physical properties of the foamed article is improved in accordance with increasing the average degree of polymerization. However, when the average degree of polymerization is more than 5000, it is difficult to industrially produce. The chlorine content of the CPVC is not particularly limited in the present invention. When a phosporic ester is not employed in the CPVC, the chlorine content of not less than 57% by weight is preferable, more preferably 63 to 69% by weight, especially 63 to 67% by weight. When the content of the CPVC in the foamed article is to be kept to be constant, it is preferable that the chlorine content is not less than 57% by weight since the amounts of generated heat and smoke are lowered in accordance with increasing the chlorine content. To the contrary, when the amounts of generated heat and smoke are kept to be not more than predetermined amount, as the physical properties of the foamed article are improved in accordance with increasing the chlorine content, the amount of the CPVC in the foamed article can be increased so it is preferable that the chlorine content is not less than 57% by weight. On the other hand, when the chlorine content is more than 75% by weight, it is difficult to industrially produce such a CPVC. Also, when the chlorine content is not less than 68% by weight, the CPVC of an obtained foamed article is carbonized and further the CPVC easily comes to be ashes when the article is burned. Therefore, it is preferable to add a phosphoric ester in the CPVC in order to prevent the CPVC burning to ashes. In this case, the chlorine content of the CPVC is 68 to 75% by weight, preferably 68 to 72% by weight. However, the chlorine content of the CPVC is not particularly limited in the present invention. It is preferable that the particle size of the CPVC is in a range which is usually used, more preferably in a range that less 10% by weight of the CPVC is not passed through 42 mesh sieve. However, the particle size of the CPVC is not limited to the above-mentioned range in the present invention.

The inorganic materials used in the present invention are employed as not merely nucleating agents but agents to improve the properties such as dimensional retention of an obtained foamed article. The inorganic materials are, for instance, inorganic fibrous materials and inorganic particles. The foamed article containing inorganic fibrous materials has more excellent dimensional retention when the foamed article is exposed in an atmosphere having high temperatures than the foamed article containing inorganic particles has. It is supposed that the reason why the foamed article containing inorganic fibrous materials shows excellent form and dimensional stability is that the inorganic fibrous materials are entangled together and they form a network structure in the obtained foamed article. Though the inorganic particles show less effect for dimensional retention than inorganic fibrous materials, the particles show an effect to make the cells of the article uniform and fine.

Preferable examples of the inorganic fibrous material are, for instance, asbestos having an average fiber length of about 1 $\mu$m to 50 mm, glass fiber, rock wool and ceramic fiber having an average fiber length of about 0.05 to 10 mm, and the like. Preferable examples of the inorganic particles are, for instance, talc having an average particle size of about 0.01 to 300 $\mu$m, calcium carbonate, antimony trioxide, aluminium hydroxide, ferric oxide, magnesium hydroxide, zinc oxide, mica, bentonite, clay, shirasu balloon (hollow material), and the like. The inorganic fibrous materials and the inorganic particles are not limited to the above-mentioned exemplified ones and others can be employed in the present invention.

Among the above-mentioned inorganic fibrous materials, asbestos can be suitably used as one of the most preferable fibrous materials from the viewpoint that the asbestos shows excellent heat resistance since the melting point is about 1520° C. and has a suitable diameter of 0.01 to 0.03 $\mu$m. Also, glass fiber, rock wool and ceramic fiber can be suitably used as one of the preferable fibers since so far as the present inventors know, they have never heard the report that these fibers cause troubles on the body such as cancer of the lungs which are caused by asbestos, and in addition to the above reason, these materials having uniform fiber length can be easily industrially produced.

However, when these glass fiber, rock wool and ceramic fiber are employed as fibrous materials, there is a tendency that much more amount of a solvent is required in comparison to the case that asbestos is employed in order to obtain a suitable foamed article of the CPVC containing inorganic materials. The rock wool and the glass fiber are more preferable because the heat resistance is high [the softening temperature of glass fiber such as E-glass is about 840° C. and the melting point of the rock wool is about 1300° C.], and the diameter is preferable for using [the diameter of rock wool is 4 to 6 $\mu$m and the diameter of the glass fiber such as E-glass is 10 to 13 $\mu$m].

Among the above-mentioned inorganic particles, antimony trioxide is preferable from the viewpoint that when the antimony trioxide is employed together with a phosphoric ester, ashing phenomenon is decreased at the time of complusively burning and the calorific value at heating is diminished.

The above-mentioned inorganic materials may be employed alone or in admixture thereof. The used amount of the inorganic materials is determined with consideration of the amount to be included in a foamed article, expansion ratio, the diameter of a cell, the uniformity of a cell, a cost, and the like. The used amount of the inorganic materials is usually prepared to 5 to 1500 parts by weight, preferably 10 to 1500 parts by weight, more preferably 30 to 1300 parts by weight, especially 50 to 1300 parts by weight, most preferably 85 to 1200 parts by weight.

The used amount of the inorganic materials to give a dimensional retention of not less than 70% to a foamed article depends on kinds of the inorganic materials. When the inorganic fibrous material is employed, only a small amount of inorganic fibrous materials gives a large dimensional retention and further, the dimensional retention is increased in accordance with enlarging the fiber length. The inorganic fibrous material such as glass fiber or rock wool can be solely employed as an inorganic material in an amount of at least 0.003 g, preferably at least 0.004 g per 1 $cm^3$ of an obtained foamed article to set a suitable dimensional stability. The upper limit of the amount of the inorganic fibrous material cannot be absolutely determined since the amount of the inorganic fibrous material depends on the expansion ratio and the like of an aimed foamed article. For instance, when an obtained foamed article has an expansion ratio of 5 times, the amount of the inorganic fibrous material is utmost 4 g per 1 $cm^3$ of an obtained foamed article. The amount of the inorganic fibrous material is preferably not more than 1 g, more preferably not more than 0.5 g per 1 $cm^3$ of an obtained foamed article in consideration of heat insulating property. When asbestos is employed as the inorganic fibrous material, it is preferable that at least 0.01 g of asbestos is contained per 1 $cm^3$ of an obtained foamed article. Since there is a necessity to use a larger amount of the inorganic particles than that of the inorganic fibrous material, it is preferable that the inorganic particles are employed together with inorganic fibrous materials. Further, in case that only the inorganic particles such as talc, calcium carbonate and an admixture thereof are employed, the amount of the inorganic particles is preferably not less than 0.06 g, more preferably not less than 0.08 g, most preferably not less than 0.1 g per 1 $cm^3$ of an obtained foamed article. The upper limit of the amount of the inorganic particles cannot be absolutely determined since the amount of the inorganic particles depends on the expansion ratio and the like of an aimed foamed article as described above. The amount of the inorganic particles is preferably not more than 4 g, more preferably not more than 1 g, most preferably 0.5 g per 1 $cm^3$ of an obtained foamed article.

The foamed article of the present invention may have any densities if the foamed article can be produced. However, when the expansion ratio is not less than 200 times, it is usually difficult to produce a normal foamed article. When the obtained foamed article is employed as a heat insulating material for building materials, it is preferable that the expansion ratio is not less than 5 times in order to maintain the physical properties such as thermal conductivity and appropriate costs. In due consideration of the amount of generated heat and smoke and the economical efficiency when an obtained foamed article is burned, it is preferable to produce a foamed article having a higher expansion ratio. Further, the expansion ratio is more preferably not less than 20 times, especially not less than 30 times, most preferably not less than 60 times. It is to be especially notified that according to the process of the present invention, a foamed CPVC article of a high expansion ratio containing inorganic fibrous materials which generally have a tendency to prevent the expansion can be also obtained as well as a foamed article containing inorganic particles.

The foamed article of the present invention may have any thickness if the foamed article can be produced. The thickness of the foamed article is usually 3 to 500 mm, preferably about 5 to 200 mm, more preferably 7 to 100 mm. Also, it is possible to optionally produce a foamed article having a thickness of 2 mm by slicing the obtained foamed article with cutting tools and the like.

Examples of the phosphoric ester used in the present invention are, for instance, an orthophosphoric ester such as tributyl phosphate, tris(chloroethyl)phosphate, tricresyl phosphate, a phosphorous ester such as triphenyl phosphite, and the like, and the present invention is not limited to the exemplified ones. Further, it is preferable to use an orthophosphoric ester which remarkably prevents the ashing phenomenon.

It is preferable in the present invention to use a phosphoric ester containing at least 7% by weight of phosphorus. When the content of phosphorus is less than 7% by weight, the ashing phenomenon is not enoughly prevented when the foamed article is compulsively burned.

In the phosphoric ester, a halogen atom such as chlorine atom or bromine atom other than phosphorus may be contained. When a halogen atom is contained in the phosphoric ester, it is preferable since effect of flame resistance is added. The content of the halogen atom contained in the phosphoric ester is preferably 20 to 50% by weight when the halogen atom is chlorine atom.

Among the phosphoric esters mentioned above, tris(chloroethyl)phosphate is preferably used since in particular tris(chloroethyl)phosphate remarkably prevents ashing phenomenon when a foamed article is compulsively burned.

The used amount of the phosphoric ester is preferably 5 to 50 parts by weight, more preferably 5 to 30 parts by weight on the basis of 100 parts by weight of the CVPC. When the used amount of the phosphoric ester is less than 5 parts by weight, the ashing phenomenon of a foamed article is not enoughly prevented and when the used amount of the phosphoric ester is more than 50 parts by weight, it is anxious that the properties such as strength of the foamed article is lowered.

Examples of the chemical blowing agent are, for instance, azobisisobutyronitrile, azodicarbonamide, diazoaminobenzene, N,N'-dinitrosopentamethylenetetramine, p-toluenesulfonylhydrazide, sodium bicarbonate, an azido compound, and the like.

The used amount of the chemical blowing agent depends on the desired expansion ratio and kinds of the blowing agent. The used amount is usually 0.1 to 100 parts by weight, preferably 10 to 40 parts by weight on the basis of 100 parts by weight of the CPVC. Also, the chemical blowing aid may be employed together with a blowing agent.

As a solvent used in the present invention, any kinds of the solvent may be employed if the solvent has an ability of gelling the CPVC.

Examples of the solvent are, for instance, an aromatic hydrocarbon such as benzene, toluene, xylene or ethylbenzene; a halogenated hydrocarbon such as chlorobenzene, 1,2,4-trichlorobenzene or tetrachloromethane; a compound containing a hydroxyl group and an ester group such as butyl cellosolve; a ketone such as diisobutyl ketone, methyl isobutyl ketone or cyclohexanone; an ester such as n-amylacetate, isoamyl formate or n-butyl acetate; a carbonic acid derivative such as diethyl carbonate; a phosphorus compound such as tricresyl phosphate, and the like. These solvents may be employed alone or in admixture thereof.

The used amount of the solvent is 10 to 1000 parts by weight, preferably 20 to 1000 parts by weight, more preferably 60 to 900 parts by weight, most preferably 100 to 900 parts by weight, especially 170 to 800 parts by weight on the basis of 100 parts by weight of the CPVC.

In general, in accordance with increasing the amount of the inorganic materials, a larger amount of the solvent is needed, and in accordance with increasing the amount of the solvent, the dimensional retention of a foamed article is more largely improved. In case of employing an inorganic fibrous material, a larger amount of the solvent is needed than the case of employing inorganic particles. However, when the amount of the solvent is too much, the foaming temperature is lowered and the percentage of closed cells is lowered even when the temperature suitable for foaming is applied, or a foamed article having a desired comfortable form is not sometimes obtained.

As a stabilizer used in the present invention, any kinds of the stabilizer can be used if the stabilizer has a capacity to prevent the decomposition and deterioration of the CPVC. The stabilizers, for instance, a plumbate stabilizer such as dibasic lead stearate; an organotin stabilizer such as dibutyltin laurates, dibutyltin maleates, dibutyltin laurate maleates are particularly suitable since these stabilizers have excellent capacities as a stabilizer.

In the present invention, a material which is usually used as an additive agent of a plastic material, for instance, a plasticizer such as dioctyl phthalate; a pigment such as ultramarine blue, watching red, titanium oxide or carbon black; an antistatic agent such as a tertiary amine, an alkyl sulfonate; a metallic soap such as lead stearate; a lubricant such as fatty acid like stearic acid can be used as occasional demands.

The process of the present invention is more specifically explained hereinbelow.

First, given amounts of the above-mentioned components are admixed and kneaded to prepare the foamable composition. The admixing and kneading procedure can be carried out by using an ordinary machine such as a ribbon blender, a double arm kneader, an intensive kneader or a Banbury mixer.

With the foamable composition a closable mold made of an aluminium alloy or the like is filled, and then the foamable composition and the mold are heated under pressure with an ordinary machine such as an oil hydraulic hot press machine.

The condition of pressure and temperature at heating depends on kinds of the components of the foamable composition and the optimum period of time, temperature and pressure are practically determined. As a result of the heating, however, it is necessary that the CPVC must be melted and, the decomposition of the blowing agent has been substantially completed. The heating temperature is higher than the softening temperature and is generally 130° to 210° C., preferably 140° to 190° C.

After the heating, the mold is cooled under pressure to a foaming temperature by cooling the heated press plate of the press machine with a cooling medium such as water.

The foaming temperature depends on kinds of the components of the foamable composition, and is usually lower than the above-mentioned heating temperature and is a temperature to give the CPVC viscoelasticity such that a cell membrane of the foamed article is not broken and the produced gas from the blowing agent does not escape. In general, the foaming temperature is selected from a temperature range of about 0° to 100° C. When the content in the mold is cooled to the foaming temperature, the mold is opened to let the content release to an atmospheric pressure.

At this time, since the content has an expansion force produced by generating gases from the blowing agent and there is a condition that the viscoelasticity of the CPVC is suitable for expanding, the content is rapidly expanded, and the expansion is completed in a short period of time to give the desired foamed article.

As mentioned above, according to the present invention, the desired foamed article can be easily prepared at one expansion step. If desired, the obtained foamed article may be re-heated.

Since in the foamed article just after the expansion, the solvent is remained, the remained solvent is vaporized to be left from the foamed article by leaving the article at a suitable temperature and in a suitable period of time for the vaporization of the solvent.

The foamed article prepared according to the present invention usually has an expansion ratio of about 5 to 200 times and an apparent density of about 0.01 to 4 g/cm$^3$ which depends on the amount of the inorganic materials contained in the foamable composition. Also, in case of employing a foamable composition containing not only inorganic particles but also inorganic fibrous materials, a foamed article having a high percentage of closed cell, that is, not less than about 60% can be prepared.

The present invention is more particularly described and explained by means of the following Examples. It is to be understood that the present invention is not limited to the Examples, and various changes and modifications may be made in the invention without departing from the spirit and scope thereof.

EXAMPLES 1 to 7

Five hundred grams of a foamable composition was prepared by using the materials shown in Table 1 in the mixing ratio shown in Table 2. The kneading procedure was carried out for 45 min under normal pressure with a closed double arm kneader having an effective volume of 1 l.

After the kneading, the foamable composition was poured into a mold of an aluminium alloy (cavity size: 160×160×22 mm). The mold was covered with an aluminium plate and was set in an oil hydraulic hot press machine. The temperature of the mold was raised from room temperature (about 20° C.) to 175° C. in 10 min while keeping the pressure of the machine at about 150 kg per 1 cm$^2$ of the surface area of the mold. After keeping the mold at 175° C. for 35 min, the mold was cooled to the temperature suitable for foaming (about 10° to 25° C.) in 10 min by passing a cold water through a cooling plate of the press machine. After keeping the mold at the temperature for about 30 min, the pressure applied to the mold was released to expand the foamable composition. The expansion was completed within about 1 sec. After the obtained foamed article was allowed to stand for about a half day at a room temperature, the foamed article was heated to a temperature of 40° to 60° C. for 1 to 2 days in a hot air circulating oven to remove the remained solvent from the foamed article.

Each of the obtained foamed articles had beautiful appearance and had a section having uniform cell size. The weight of every component contained in 1 cm³ of the foamed article, apparent density, expansion ratio and percentage of closed cell were measured in accordance with the following methods. The results are shown in Table 2.

(The weight of every component contained in 1 cm³ of the foamed article)

The weight of every component contained in 1 cm³ of the foamed article was measured by the following equation.

$$\text{[The weight of every component contained in 1 cm}^3 \text{ of the foamed article (g)]} = \text{[apparent density (g/cm}^3\text{)]} \times \frac{\text{[Used amount of the component (g)]}}{\text{[Used amount of the CPVC (g)] + [Used amount of the inorganic materials (g)]}}$$

The term "every component" means a CPVC, inorganic fibrous materials or inorganic particles. (Apparent density)

A test piece of 20 mm cubic, 25 mm cubic or 75×25×15 mm was cut off from the foamed article and its volume and weight were measured (apparent density)=

$$(\text{apparent density}) = \frac{\text{weight (g)}}{\text{volume (cm}^3\text{)}}.$$

(Expansion ratio)

The expansion ratio was measured in accordance with the following equation.

$$[\text{Expansion ratio}] = \frac{\text{[True specific gravity of the } CPVC\text{]}}{\text{[the weight of the } CPVC \text{ contained in 1 cm}^3 \text{ of the foamed article]}}$$

(Percentage of closed cell)

The percentage of closed cell was measured in accordance with ASTM D 2856 with an air comparison type aerometer manufactured by Beckman-Toshiba Kabushiki Kaisha.

COMPARATIVE EXAMPLE 1

A composition was prepared in the same manner as in Example 1 except that toluene was not employed. Then the composition was processed to expand in the same manner and conditions as in Example 1. However, the composition was not expanded at all.

COMPARATIVE EXAMPLE 2

A foamable composition was prepared by using the materials shown in Table 1 in the mixing ratio in Table 2. Then the composition was processed to expand in the same manner and conditions as in Examples 1 to 7. When the mold was opened, a foamed article was produced. However, the foamed article was immediately shrunk and was not an article having a preferable form.

TABLE 1

| Material | Item | | Detail | |
| --- | --- | --- | --- | --- |
| CPVC | XH | 9225 | Average polymerization degree: 2500, | Chlorine content: 69% |
| | XH | 9224 | Average polymerization degree: 2400, | Chlorine content: 69% |
| | XH | 8224 | Average polymerization degree: 2400, | Chlorine content: 68% |
| | XH | 7225 | Average polymerization degree: 2500, | Chlorine content: 67% |
| | XH | 7206 | Average polymerization degree: 600, | Chlorine content: 67% |
| | XH | 3225 | Average polymerization degree: 2500, | Chlorine content: 63% |
| | XH | 59224 | Average polymerization degree: 2400, | Chlorine content: 59% |
| | XH | 8211 | Average polymerization degree: 1100 | Chlorine content: 68% |
| Resin for mixing with the CPVC | Chlorinated polyethylene | | Molecular weight of the polyethylene: $10 \times 10^4$ to $15 \times 10^4$ Chlorine content: 35% | |
| Inorganic particles | Talc | | Average particle size: 5.5 μm | |
| | Calcium carbonate | | Particle size: passing through 70 mesh sieve | |
| | Aluminium hydride | | Average particle size: 6.0 μm | |
| | Ferric oxide | | | |
| | Antimony trioxide | | Average particle size: 0.8 to 1.2 μm | |
| Inorganic fibrous material | Asbestos | | 7M by the Quebec Asbestos Mining Association Test Procedure | |
| | Glass fiber | | Diameter: 10 μm, Length: 1.5 mm | |
| | Rock wool | | Diameter: 4 μm, Length: 7 mm | |
| Blowing agent | AIBN | | Azobisisobutyronitrile | |
| Solvent | Toruene | | | |
| | Benzene | | | |
| | Xylene | | | |
| | Ethylbenzene | | | |
| | Chlorobenzene | | | |
| Stabilizer | F-22 | | Bis(dinormalbutyltinmonolaurate)maleate | |
| Phosphoric ester | CLP | | Trischloroethylphosphate (Phosphorus content: 11%, Chlorine content: 36%) | |

TABLE 1-continued

| Material | Item | Detail |
|---|---|---|
| | TBP | Tributylphosphate (Phosphorus content: 12%) |

(Note)
In Table 1, the term "%" means "% by weight".

TABLE 2

| | Components (parts by weight) | | | | | | Foaming |
|---|---|---|---|---|---|---|---|
| | | Inorganic material | | | | | temperature |
| | CPVC | Inorganic fibrous material | Inorganic particle | Blowing agent | Solvent | Stabilizer | (°C.) |
| Ex. No. | | | | | | | |
| 1 | XH9224 (100) | — | Talc(50) Calcium carbonate(50) | AIBN(22) | Toluene(180) | F-22(6) | 25 |
| 2 | XH9224 (100) | — | Talc(75) Calcium carbonate(75) | AIBN(22) | Tolulene(190) | F-22(6) | 10 |
| 3 | XH9224 (100) | Asbestos(30) | Talc(35) Calcium carbonate(35) | AIBN(20) | Xylene(250) | F-22(6) | 20 |
| 4 | XH9224 (100) | Asbestos(30) | Talc(35) Calcium carbonate(35) | AIBN(20) | Ethylbenzene(250) | F-22(6) | 19 |
| 5 | XH9224 (100) | Asbestos(30) | Antimony trioxide(95) Ferric oxide(30) | AIBN(22) | Ethylbenzene(270) | F-22(6) | 18 |
| 6 | XH8224 (100) | Asbestos(30) | Talc(6) | AIBN(25) | Toluene(230) | F-22(6) | 19 |
| 7 | XH7225 (100) | Asbestos(30) | Talc(6) Aluminium hydroxide(200) | AIBN(25) | Benzene(300) | F-22(6) | 18 |
| Com. Ex. | | | | | | | |
| 1 | XH9224 (100) | — | Talc(50) Calcium carbonate(50) | AIBN(22) | — | F-22(6) | 25 |
| 2 | XH8211 (100) | — | Talc(25) Calcium carbonate(25) | AIBN(8) | Toluene(50) | F-22(6) | 60 to 80 |

| | Physical properties | | | | | |
|---|---|---|---|---|---|---|
| | Weight of component contained in 1 cm³ of foamed article | | | Apparent density (g/cm³) | Expansion ratio (times) | Percentage of closed (%) |
| | CPVC (g) | Inorganic fibrous material (g) | Inorganic particle (g) | | | |
| Ex. No. | | | | | | |
| 1 | 0.032 | 0 | 0.032 | 0.064 | 50 | 81 |
| 2 | 0.038 | 0 | 0.056 | 0.094 | 43 | 80 |
| 3 | 0.066 | 0.020 | 0.046 | 0.131 | 25 | 78 |
| 4 | 0.038 | 0.011 | 0.027 | 0.076 | 42 | 86 |
| 5 | 0.056 | 0.017 | 0.071 | 0.144 | 29 | 76 |
| 6 | 0.032 | 0.009 | 0.002 | 0.043 | 50 | 94 |
| 7 | 0.043 | 0.013 | 0.090 | 0.146 | 36 | 75 |
| Com. Ex. | | | | | | |
| 1 | A foamed article was not produced. | | | | | |
| 2 | A foamed article having a preferable form was not produced. | | | | | |

EXAMPLES 8 TO 19 AND COMPARATIVE EXAMPLES 3 AND 4

Three thousand grams of a foamable composition was prepared by using the materials shown in Table 1 in the mixing ratio shown in Table 3. The kneading procedure was carried out for 30 min under normal pressure with a Henschel mixer.

After the kneading, the foamable composition and a solvent were poured into an intensive kneader and were kneaded at 50 to 80° C. for 30 min to give a massive composition. The massive composition was poured into a mold, and the mold was covered with a plate. The temperature of the mold was raised from room temperature to 175° C. and was kept at 175° C. for 35 min while keeping the pressure of the plate at 160 kg/cm². Then the mold was cooled to 20° C. and the pressure applied to the mold was released and the mold was opened to the atmospheric pressure to expand the composition. The obtained foamed article was left at room temperature and was put in a hot-air drier having a temperature of 80° C. The apparent density and the like, dimensional retention and combustibility were measured. The apparent density and the like were measured in the same manner as in Examples 1 to 7, and the dimensional retention and combustibility were measured in accordance with the following methods. The results were shown in Table 3.

(Dimensional retention)

A test piece having a size of about 75×25×15mm was cut from the foamed article and the test piece was left in a hot-air drier having a temperature of 200° C. for one hour. The size of the test piece before the heating, that is, $l_1 \times l_2 \times l_3$ mm and the size of the test piece after heating, that is, $l'_1 \times l'_2 \times l'_3$ mm were measured. The dimensional retention was calculated in accordance with the following equation.

[Dimensional retention
$(\%)] = [(l'_1/l_1) \times (l'_2/l_2) \times (l'_3/l_3)]^{\frac{1}{3}} \times 100$ In case that the test piece was largely deformed by heating, the test piece was dipped into water and the volume (V') was measured. From the volume (V') and a volume of the test piece before heating (V), dimensional retention was measured.

$$[\text{Dimensional retention (\%)}] = (V'/V)^{\frac{1}{3}} \times 100$$

(Combustibility)

The obtained foamed articles were applied to surface test which is prescribed in JIS A 1321, and area retention of the articles was measured.

It is known from the results shown in Table 3 that the foamed articles produced in Comparative Examples 3 and 4 were remarkably deteriorated in dimensional retention since the amount of asbestos contained in 1 cm³ of the foamed article was zero. It shows that when small amount of asbestos as an inorganic fibrous material is included in a foamed article, fire-resistance such as formal and dimensional stability when the article is burned, and large dimensional retention when the article is heated to a high temperature more than the softening temperature of the CPVC, are given to the foamed article.

EXAMPLES 20 TO 25 AND COMPARATIVE EXAMPLES 5 AND 6

The procedures in Examples 1 to 7 were repeated except that compositions were prepared by using the materials shown in Table 1 in the mixing ratio shown in Table 3.

The obtained foamed articles were left in a hot air circulating type oven having a temperature of 40° to 60° C. for one to two days to vaporize and remove the solvent remained in the article.

The weight of every component contained in 1 cm³ of the foamed article, apparent density, expansion ratio and dimensional retention were measured in the same manner as in Examples 1 to 19. The results are shown in Table 3.

TABLE 3

| | Components (parts by weight) | | | | | | |
|---|---|---|---|---|---|---|---|
| | Resin | | Inorganic material | | | | |
| | CPVC | Resin mixed with the CPVC | Inorganic fibrous material | Inorganic particle | Blowing agent | Solvent | Stabilizer |
| Ex. No. | | | | | | | |
| 8 | XH7225 (100) | — | Asbestos(50) | Talc(6) | AIBN(21) | Toluene(230) | F-22(6) |
| 9 | XH7225 (100) | — | Asbestos(50) | Talc(50) | AIBN(28) | Toluene(230) | F-22(6) |
| 10 | XH7225 (100) | — | Asbestos(35) | — | AIBN(26) | Benzene(200) Chlorobenzene(30) | F-22(6) |
| 11 | XH3225 (100) | — | Asbestos(50) | Talc(6) | AIBN(21) | Benzene(300) | F-22(6) |
| 12 | XH9225 (100) | — | Asbestos(51) | Talc(6) | AIBN(21) | Ethylbenzene(250) | F-22(6) |
| 13 | XH7206 (100) | — | Asbestos(50) | Talc(6) | AIBN(22) | Toluene(260) | F-22(6) |
| 14 | XH7225 (100) | — | Asbestos(100) | Talc(6) | AIBN(21) | Benzene(250) | F-22(6) |
| 15 | XH7225 (100) | — | — | Talc(50) Calcium carbonate(50) | AIBN(17) | Toluene(230) | F-22(6) |
| 16 | XH7225 (100) | — | Asbestos(50) | Talc(100) | AIBN(25) | Toluene(240) | F-22(6) |
| 17 | XH7225 (100) | — | Asbestos(70) | Talc(25) Calcium carbonate(25) | AIBN(30) | Toluene(240) | F-22(6) |
| 18 | XH7225 (100) | — | Asbestos(35) | Talc(6) | AIBN(10) | Toluene(230) | F-22(6) |
| 19 | XH7225 (100) | Chlorinated polyethylene (10) | Asbestos(50) | Talc(50) Calcium carbonate(50) | AIBN(25) | Toluene(240) | F-22(6) |
| 20 | XH9224 (100) | — | Asbestos(30) | Talc(6) | AIBN(22) | Toluene(230) | F-22(6) |
| 21 | XH9224 (100) | — | Asbestos(50) | Talc(25) Calcium carbonate(25) | AIBN(33) | Toluene(230) | F-22(6) |
| 22 | XH9224 (100) | — | Rock wool(10) | Talc(1) | AIBN(13) | Toluene(230) | F-22(6) |
| 23 | XH9224 (100) | — | Glass wool(10) | Talc(1) | AIBN(13) | Toluene(230) | F-22(6) |
| 24 | XH59224 (100) | — | Rock wool(10) | Talc(1) | AIBN(13) | Toluene(200) | F-22(6) |
| 25 | XH9224 (100) | — | Asbestos(30) | — | AIBN(25) | Toluene(200) | F-22(6) |
| Com. Ex. | | | | | | | |
| 3 | XH7225 (100) | — | — | — | AIBN(21) | Toluene(130) | F-22(6) |
| 4 | XH7225 (100) | — | — | Talc(50) | AIBN(21) | Toluene(160) | F-22(6) |
| 5 | XH9224 (100) | — | — | — | AIBN(22) | Toluene(120) | F-22(6) |
| 6 | XH9224 (100) | — | — | Talc(10) | AIBN(22) | Toluene(130) | F-22(6) |

Physical properties

Weight of component contained in 1 cm³

TABLE 3-continued

| | of foamed article | | | | | | |
|---|---|---|---|---|---|---|---|
| | CPVC (g) | Inorganic fibrous material (g) | Inorganic particle (g) | Apparent density (g/cm³) | Expansion ratio (times) | Dimensional retention (%) | Area retention (%) | Remarks |
| Ex. No. | | | | | | | | |
| 8 | 0.046 | 0.023 | 0.003 | 0.072 | 34 | 87 | 90 | |
| 9 | 0.024 | 0.012 | 0.012 | 0.048 | 66 | 71 | 63 | |
| 10 | 0.031 | 0.011 | 0 | 0.042 | 51 | 70 | — | |
| 11 | 0.047 | 0.024 | 0.003 | 0.074 | 32 | 87 | — | |
| 12 | 0.045 | 0.023 | 0.003 | 0.071 | 36 | 87 | — | |
| 13 | 0.044 | 0.022 | 0.003 | 0.069 | 36 | 86 | — | |
| 14 | 0.047 | 0.047 | 0.003 | 0.097 | 34 | 96 | — | |
| 15 | 0.060 | 0 | 0.060 | 0.120 | 26 | 70 | — | |
| 16 | 0.032 | 0.016 | 0.032 | 0.080 | 49 | 89 | — | |
| 17 | 0.016 | 0.011 | 0.008 | 0.035 | 99 | 74 | — | |
| 18 | 0.100 | 0.035 | 0.006 | 0.141 | 16 | 92 | — | |
| 19 | 0.032 | 0.016 | 0.032 | 0.080 | 48 | 89 | — | |
| 20 | 0.044 | 0.013 | 0.003 | 0.060 | 36 | 81 | — | |
| 21 | 0.015 | 0.008 | 0.008 | 0.030 | 107 | 75 | — | |
| 22 | 0.104 | 0.010 | 0.001 | 0.115 | 16 | 88 | — | |
| 23 | 0.106 | 0.011 | 0.001 | 0.118 | 15 | 83 | — | |
| 24 | 0.100 | 0.010 | 0.001 | 0.111 | 15 | 86 | — | |
| 25 | 0.045 | 0.014 | 0 | 0.059 | 35 | 76 | — | |
| Com. Ex. | | | | | | | | |
| 3 | 0.046 | 0 | 0 | 0.046 | 34 | 40 | — | It was impossible to measure the area retention since a foamed article was largely shrunk and deformed and broken. |
| 4 | 0.046 | 0 | 0.023 | 0.069 | 34 | 52 | — | The same as above |
| 5 | 0.044 | 0 | 0 | 0.044 | 37 | 46 | | |
| 6 | 0.042 | 0 | 0.004 | 0.046 | 39 | 51 | — | |

EXAMPLES 26 TO 33

The same procedures in Examples 20 to 25 were repeated except that compositions were prepared by using the materials shown in Table 1 in the mixing ratio shown in Table 4. Then a remained solvent in the obtained article was removed.

A test piece having a size of 220×220×25 mm was cut from the foamed article and was applied to surface test which is prescribed in JIS A 1321.

Further, a test piece of 20 mm cubic was cut from the foamed article, and the apparent density and percentage of closed cell were measured in the same manner as in Examples 1 to 7. The results are shown in Table 4.

COMPARATIVE EXAMPLE 7

The procedure in Example 26 was repeated except that CLP was not employed. When a test piece of the obtained foamed article was subjected to the surface test in the same manner as in Example 26, the test piece was burned to ashes and had many small cracks. When the test piece was taken out from a furnace, the test piece was broken. The results are shown in Table 4.

COMPARATIVE EXAMPLE 8

The procedure in Example 27 was repeated except that CLP was not employed. When a test piece of the obtained foamed article was subjected to the surface test in the same manner as in Example 27, the test piece was burned to ashes and had ten-odd small cracks. However, it was possible to take out the test piece from the furnace. The results were shown in Table 4.

In addition to the ingredients used in the Examples, other ingredients can be used in the Examples as set forth in the specification to obtain substantially the same results.

TABLE 4

| | Foamable composition (parts by weight) | | | | | | |
|---|---|---|---|---|---|---|---|
| | | Inorganic material | | | | | |
| | CPVC | Inorganic fibrous material | Inorganic particle | Blowing agent | Solvent | Stabilizer | Phosphate ester |
| Ex. No. | | | | | | | |
| 26 | XH9224 (100) | Asbestos(30) | Talc(50) | AIBN(20) | Ethylbenzene (220) | F-22(6) | CLP(15) |
| 27 | XH8224 (100) | Asbestos(30) | Talc(50) | AIBN(19) | Toluene(220) | F-22(6) | CLP(20) |
| 28 | XH8224 (100) | Asbestos(30) | Talc(50) Calcium carbonate(50) | AIBN(23) | Toluene(260) | F-22(6) | CLP(15) |
| 29 | XH8224 (100) | Asbestos(30) | Talc(50) Aluminium hydroxide(100) | AIBN(23) | Toluene(260) | F-22(6) | CLP(15) |
| 30 | XH8224 (100) | Asbestos(30) | Talc(50) Antimony trioxide(2) | AIBN(19) | Toluene(220) | F-22(6) | CLP(10) |
| 31 | XH8224 (100) | Asbestos(30) | Talc(50) Antimony | AIBN(19) | Toluene(220) | F-22(6) | CLP(15) |

TABLE 4-continued

| | | | | | | | |
|---|---|---|---|---|---|---|---|
| 32 | XH8224 (100) | Asbestos(30) | trioxide(6) Talc(50) Antimony trioxide(8) | AIBN(19) | Toluene(220) | F-22(6) | CLP(20) |
| 33 | XH8224 (100) | Asbestos(30) | Talc(50) | AIBN(19) | Toluene(220) | F-22(6) | TBP(15) |
| Com. Ex. | | | | | | | |
| 7 | XH9224 (100) | Asbestos(30) | Talc(50) | AIBN(20) | Ethylbenzene (220) | F-22(6) | — |
| 8 | XH8224 (100) | Asbestos(30) | Talc(50) | AIBN(20) | Toluene(220) | F-22(6) | — |

| | Physical properties of the article | | | | | |
|---|---|---|---|---|---|---|
| | Weight of component contained in 1 $cm^3$ of article (g) | | | | | |
| | CPVC | Inorganic fibrous material | Inorganic particle | Apparent density (g/$cm^3$) | Expansion ratio (times) | Percentage of closed cell (%) |
| Ex. No. | | | | | | |
| 26 | 0.033 | 0.010 | 0.016 | 0.059 | 49 | 88 |
| 27 | 0.038 | 0.011 | 0.019 | 0.068 | 42 | 90 |
| 28 | 0.040 | 0.012 | 0.040 | 0.093 | 39 | 83 |
| 29 | 0.045 | 0.014 | 0.068 | 0.126 | 35 | 79 |
| 30 | 0.039 | 0.012 | 0.020 | 0.071 | 41 | 86 |
| 31 | 0.035 | 0.010 | 0.020 | 0.065 | 45 | 86 |
| 32 | 0.036 | 0.011 | 0.021 | 0.067 | 45 | 90 |
| 33 | 0.048 | 0.014 | 0.024 | 0.086 | 33 | 87 |
| Com. Ex. | | | | | | |
| 7 | 0.031 | 0.009 | 0.015 | 0.055 | 53 | 91 |
| 8 | 0.032 | 0.010 | 0.016 | 0.058 | 49 | 89 |

| | Results of surface test | | | | |
|---|---|---|---|---|---|
| | Ashing phenomenon | Crack | Resual flame (second) | Temperature · time · area (°C. · minute) | Smoking coefficient (-) |
| Ex. No. | | | | | |
| 26 | Nothing | Nothing | Nothing | 79 | 52 |
| 27 | " | " | " | 59 | 44 |
| 28 | " | " | " | 76 | 26 |
| 29 | " | " | " | 56 | 38 |
| 30 | " | " | " | 83 | 57 |
| 31 | " | " | " | 20 | 49 |
| 32 | " | " | " | 34 | 38 |
| 33 | " | " | " | 86 | 57 |
| Com. Ex. | | | | | |
| 7 | Generated | Generated | Nothing | 77 | 50 |
| 8 | " | " | " | 72 | 47 |

EXAMPLES 34 TO 36 AND COMPARATIVE EXAMPLES 9 TO 15

A foamable composition was prepared by using the materials shown in Table 5 in the mixing ratio shown in Table 5. The kneading procedure was carried out for 45 min under normal pressure with a closed double arm kneader.

After the kneading, the foamable composition was poured into a mold of an aluminium alloy (cavity size: 100×100×15 mm). The mold was covered with an aluminium plate and was set in an oil hydraulic hot press machine. The temperature of the mold was raised from room temperature (about 20° C.) to 180° C. in 10 min while keeping the pressure of the machine at about 100 kg per 1 $cm^2$ of the surface area of the mold. After keeping the mold at 180° C. for 3 min, the mold was cooled to the temperature suitable for foaming (about 10° to 25° C.) in 10 min by passing a cold water through a cooling plate of the press machine. After keeping the mold at the temperature for about 30 min, the pressure applied to the mold was released to expand the foamable composition. The expansion was completed within about 1 sec. After the obtained foamed article was allowed to stand for about a half day at a room temperature, the foamed article was heated to a temperature of 40° to 60° C. for 1 to 2 days in a hot air circulating oven to remove the remained solvent from the foamed article. The apparent density, expansion ratio and dimensional retention were measured in the same manner as in Examples 1 to 7 and Examples 8 to 19. The results are shown in Table 5.

TABLE 5

| | Components (parts by weight) | | | | | Physical properties | | | |
|---|---|---|---|---|---|---|---|---|---|
| | | Inorganic material | | Blowing agent | Solvent | Content of inorganic materials (g/$cm^3$) | Apparent density (g/$cm^3$) | Expansion ratio (times) | Dimensional retention (%) |
| | CPVC | Calcium carbonate | Glass fiber | | | | | | |
| Ex. No. | | | | | | | | | |
| 34 | XH7225 | | 5 | AIBN 10 | Toluene 220 | 0.004 | 0.094 | 18 | 78 |
| 35 | XH7225 | | 10 | AIBN 10 | Toluene 220 | 0.010 | 0.113 | 16 | 81 |

TABLE 5-continued

| | | Components (parts by weight) | | | | Physical properties | | | |
|---|---|---|---|---|---|---|---|---|---|
| | | Inorganic material | | | | Content of inorganic materials (g/cm³) | Apparent density (g/cm³) | Expansion ratio (times) | Dimensional retention (%) |
| | CPVC | Calcium carbonate | Glass fiber | Blowing agent | Solvent | | | | |
| 36 Com. Ex. | XH7225 | | 30 | AIBN 10 | Toluene 220 | 0.030 | 0.131 | 16 | 84 |
| 9 | XH7225 | | 5 | Ethanol 10 | — | 0.008 | 0.167 | 10 | 66 |
| 10 | XH7225 | | 10 | Ethanol 10 | — | — | Not expanded | | — |
| 11 | XH7225 | | 30 | Ethanol 10 | — | — | Not expanded | | — |
| 12 | XH7225 | 10 | | Ethanol 15 | — | 0.006 | 0.062 | 28 | 49 |
| 13 | XH7225 | 50 | | Ethanol 15 | — | 0.065 | 0.195 | 12 | 59 |
| 14 | XH7225 | 10 | | AIBN 15 | Toluene 220 | 0.006 | 0.068 | 26 | 52 |
| 15 | XH7225 | 50 | | AIBN 15 | Toluene 220 | 0.032 | 0.095 | 25 | 64 |

As is clear from the results shown in Table 5, the foamed articles prepared in Examples 34 to 36 of the present invention are extremely excellent in dimensional retention in comparison with that prepared in Comparative Examples 9 to 15 since a chemical blowing agent and a solvent, which are not used in Comparative Examples 9 to 15, are employed in the present invention.

Further, although a specific blowing agent and a solvent are used in Comparative Examples 14 and 15, since the content of inorganic materials is not enough, the prepared foamed articles in Comparative Examples 14 and 15 do not have a sufficient dimensional retention, respectively.

In addition to the ingredients used in the examples, other ingredients can be used in the examples as set forth in the specification to obtain substantially the same results.

What is claimed is:

1. A foamed article of a chlorinated vinyl chloride resin containing an inorganic material, which contains an inorganic fibrous material in an amount of not less than 0.003 g per 1 cm³ of the article or inorganic particles in an amount of not less than 0.06 g per 1 cm³ of the article and which has dimensional retention of not less than 70% when the article is heated at 200 °C. for one hour and an expansion ratio of not less than 5 times, which is prepared by the process comprising the steps of
   (1) preparing a foamable composition by kneading a mixture comprising a chlorinated vinyl chloride resin, an inorganic material, a chemical blowing agent and a solvent, having the ability to gel the chlorinated vinyl chloride,
   (2) filling a closable mold with the foamable composition,
   (3) heating the foamable composition under pressure in the mold to generate a gelled chlorinated vinyl chloride resin and to decompose said chemical blowing agent,
   (4) cooling the foamable composition in the mold to a temperature suitable for expansion, and
   (5) opening the mold to give a foamed article.

2. The foamed article of claim 1, wherein said inorganic fibrous material is asbestos.

3. The foamed article of claim 1, wherein said inorganic fibrous material is glass fiber.

4. The foamed article of claim 1, wherein said inorganic fibrous material is rock wool.

5. The foamed article of claim 1, wherein the article contains an inorganic fibrous material and inorganic particles.

6. The foamed article of claim 1, wherein the chlorine content of said chlorinated vinyl resin is 57 to 75% by weight.

7. The foamed article of claim 1, wherein the expansion ratio is 5 to 200 times.

8. The foamed article of claim 1, wherein the article contains a phosphoric ester.

9. The foamed article of claim 8, wherein said phosphoric ester is an orthophosphoric ester.

10. The foamed article of claim 8, wherein said phosphoric ester contains not less than 7% by weight of phosphorus.

11. The foamed article of claim 8, wherein said phosphoric ester contains a halogen atom other than phosphorus.

12. The foamed article of claim 8, wherein said phosphoric ester is tris(chloroethyl) phosphate.

13. The foamed article of claim 8, wherein the content of said phosphoric ester is 5 to 50 parts by weight based on 100 parts by weight of the chlorinated vinyl chloride resin.

14. The foamed article of claim 8, wherein said inorganic material contains an inorganic fibrous material and antimony trioxide.

15. The foamed article of claim 8, wherein the chlorine content of said chlorinated vinyl chloride resin is 68 to 75% by weight.

16. The foamed article of claim 1, wherein said chlorinated vinyl chloride resin has 300 to 5000 of average degree of polymerization.

17. The foamed article of claim 1, wherein said solvent has an ability to gell the chlorinated vinyl chloride resin.

18. The foamed article of claim 17, wherein said solvent is at least one member selected from the group consisting of an aromatic hydrocarbon, a halogenated hydrocarbon, a compound containing a hydroxyl group and an ester group, an ester, a carbonic acid derivative and a phosphorus compound.

19. The foamed article of claim 1, wherein the content of said solvent is 10 to 1000 parts by weight based on 100 parts by weight of the chlorinated vinyl chloride resin.

20. The foamed article of claim 1, wherein said foamable composition contains a stabilizer.

* * * * *